United States Patent [19]
Oishi et al.

[11] 3,719,928
[45] March 6, 1973

[54] SWEEP SIGNAL METER READING SYSTEM

[75] Inventors: Hiroshi Oishi; Fumio Aoki, both of Yokohama. Kohoku-ku; Shigeru Kawanno, Mito-shi; Yasushi Kudo, Karakura-shi; Hideo Kobayashi, Yokohama, Totsuka-ku; Takeo Hyodo, Kamakura-shi, all of Japan

[73] Assignees: Hitachi, Ltd.; The Tokyo Electric Power Co., Tokyo, Japan

[22] Filed: Feb. 10, 1971

[21] Appl. No.: 114,211

[30] Foreign Application Priority Data

April 3, 1970 Japan..............................45/28451

[52] U.S. Cl. .......................... 340/151 R, 340/171 R
[51] Int. Cl. ................................................H04q 9/00
[58] Field of Search .................. 340/151 R; 179/2 A

[56] References Cited

UNITED STATES PATENTS

| | | | |
|---|---|---|---|
| 2,154,694 | 5/1939 | Pakala | 179/2 A |
| 3,114,891 | 12/1963 | Auer | 179/2 A |
| 3,164,771 | 1/1965 | Milford | 340/151 X |
| 3,325,598 | 6/1967 | O'Neill | 179/2 A |
| 3,414,676 | 12/1968 | Long | 179/2 A |

*Primary Examiner*—Harold Pitts
*Attorney*—Craig, Antonelli, Stewart & Hill

[57] ABSTRACT

An information detection method and system for carrying out the automatic reading of meters disposed in domestic users houses. A series resonance circuit having a peculiar resonance frequency is connected in parallel to each meter and on-off controlled by the meter at certain quantity of consumption. A sweep oscillator generates a sweep signal and supplied it through hybrid circuits to the resonance circuit, the hybrid circuits mixing the sweep signal and the reflected signal to provide a detection signal with no noise. Such a detection signal is allowed to pass through a gate which is controlled by the sweep signal and reference resonance circuits.

5 Claims, 6 Drawing Figures

INVENTORS
HIROSHI OISHI, FUMIO AOKI,
SHIGERU KAWANO, YASUSHI KUDO,
HIDEO KOBAYASHI & TAKEO HYODO

BY Craig, Antonelli, Stewart & Hill
ATTORNEYS

SWEEP SIGNAL METER READING SYSTEM

This invention relates to a method and a system of information detection.

In electrically remote-reading the figures in an integrating power, water, gas, or telephone call meter in which a physical quantity is measured, integrated, transformed into mechanical rotational movement and recorded as a figure of at least two digits, there are several methods such as one comprising the steps of generating an electrical pulse for each rotation of a disk which rotates in proportion to the physical quantity under measurement and integrating such pulses on the receiver located in a central station to indicate the physical quantity, and one comprising the steps of storing the integrated value of a physical quantity in a register provided in each customer and automatically sending the integrated value upon request from the receiver side to receive it on the receiver side. However, these methods are accompanied with such drawbacks that an active equipment such as a generator, a coder and a register should be newly equipped to respective users, resulting in enormous cost, with the further need of manpower for the maintenance of such equipment.

The present invention is concerned with information detection of such a type in which a sweep signal is generated from a sweep generator provided in a central station and transmitted through line concentrators to scanning units provided for respective pole transformers, there superposed in the low voltage distribution lines by a coupling transformer and transmitted to respective users. In each user's unit, an LC serial resonance circuit (pick-up unit) having a resonance frequency band which is different for each user is provided and connected in parallel to the distribution line every time a rotating disk forming a part of an integrating power meter advances by a predetermined angle. Thus, the integrated value in the power meter is replaced with the switching action of the resonance circuit. The impedance, transmission characteristics or other electrical characteristics dependant on the frequency of a distribution line is detected with the use of a sweep generator so as to detect the measured physical quantity of the respective users at the central station.

An object of this invention is to reduce the affection of the linearity of a sweep generator to be used in the above detection system.

Another object of this invention is to provide a detection arrangement which is relatively insensitive to external noises and the level variation, etc.

According to an embodiment of this invention, there is provided an information detection system for detecting the data of a multiplicity of information sources lying along a line, utilizing a sweep generator and the switching of resonance circuits provided to the respective information sources, comprising:

means including a first hybrid circuit for connecting the output of a sweep generator to said line through said hybrid circuit, deriving the reflected wave from said line through another terminal of said hybrid circuit and mixing the reflected wave with the output of said sweep generator after amplitude limitation to generate a detection output;

means including a second hybrid circuit for preventing noises and the reflected waves from said line from mixing into said output of the sweep generator; and means for deriving a part of the output of said sweep generator to a parallel connected circuit of series resonance impedances which resonate at respective sampling frequencies, mixing the reflected wave with said output of the sweep generator to provide a sampling pulse, and sampling the detection output by said sampling pulse.

Further, there is provided an information detection method for detecting the data of a multiplicity of information sources lying along a line comprising the steps of:

sending a sweep signal to information sources having respective resonance frequencies to obtain the reflected waves carrying information;

mixing the sweep signal and each of the reflected waves to obtain detection signal carrying information in its phase;

controlling gates for passing the detection signals by the sweep signal and reference resonance circuits.

Now, the present invention will be described in more detail referring to the accompanying drawings in which.

Figure 1:
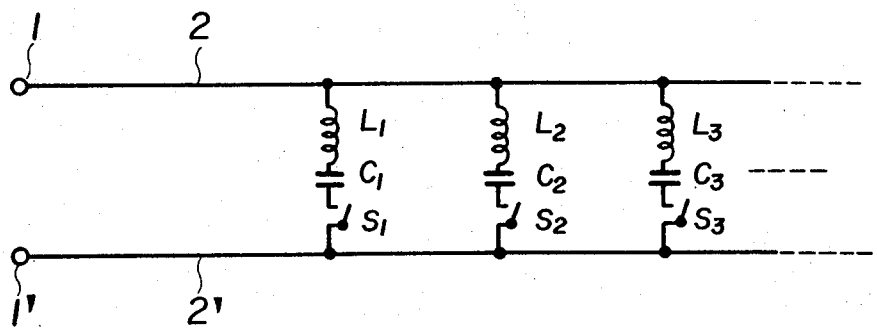
FIG. 1 is a schematic diagram for illustrating the principal idea of the information detection according to the present invention.

Firstly, the operation and principles of the information detection system in which this invention is exploited will be described referring to FIG. 1. In the figure, numerals 1 and 1' indicate information detecting terminals, 2 and 2' transmission lines, letters $L_1$, $L_2$, $L_3$, . . . are inductances, $C_1$, $C_2$, $C_3$, . . . capacitances, and $S_1$, $S_2$, $S_3$, . . . switches to be closed in accordance with the data of the respective information sources. Series resonance circuits comprising $L_1$ and $C_1$, $L_2$ and $C_2$, $L_3$ and $C_3$, . . . have different resonance frequencies corresponding to the identification of the respective information sources. Letting the impedance of this circuit seen from terminals 1, 1' be Z, Z becomes zero at the resonance frequency of a series resonance circuit when its switch is closed. Thus, the state of respective information sources can be detected by checking the variation in the impedance Z with respect to frequency.

Figure 2:
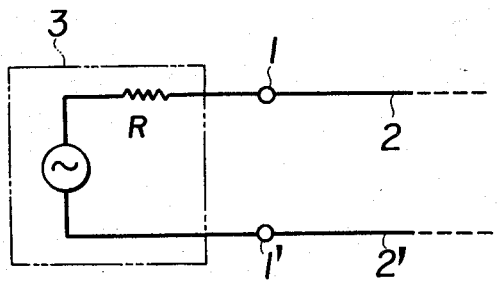
FIG. 2 is a schematic diagram for illustrating the conventional method.

One of the simplest way of carrying this out is schematically illustrated in FIG. 2, in which numeral 3 indicates a sweep generator. Keeping the output level of the sweep generator 3 constant, when the voltage across or the current through the terminals 1, 1' is monitored with the frequency of the sweep signal being scanned, a minimum or maximum point indicates a series resonance frequency by which the closed contacts of the information switch can be known. Such a detection method is already known, therefore the detailed description is dispensed with in this specification. But, in any type of such method, information is detected by the variation in the amplitude of voltage across or current through the detection terminals so that the principle is the same with that of the detection of an amplitude modulated wave. Thus, if there exists a constant or pulse-like noise in a transmission line, an erroneous detection of information may occur. Further, if the output level of the sweep generator is subject to a variation above the threshold level of the amplitude detector by the influence of the source voltage, the external temperature, or other external conditions, an erroneous detection may similarly occur.

Figure 3:
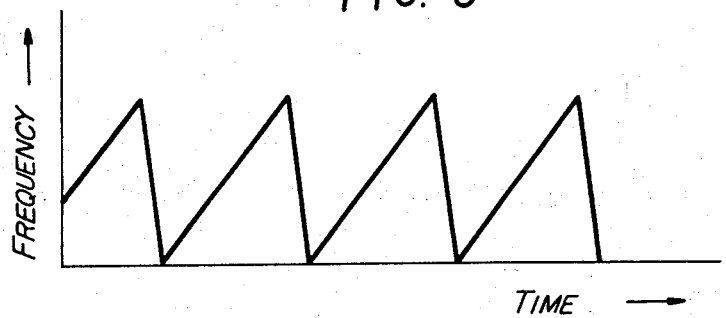
FIG. 3 is a curve of the output frequency of a sweep generator with respect to time.

In such a detection system, the frequency of the sweep generator is normally changed in saw-tooth waveform with respect to time as is shown in FIG. 3. If the frequency-to-time curve is not completely linear, the detected result should be corrected. Special care should be given to this aspect of the design and manufacture of a sweep generator.

Figure 4:
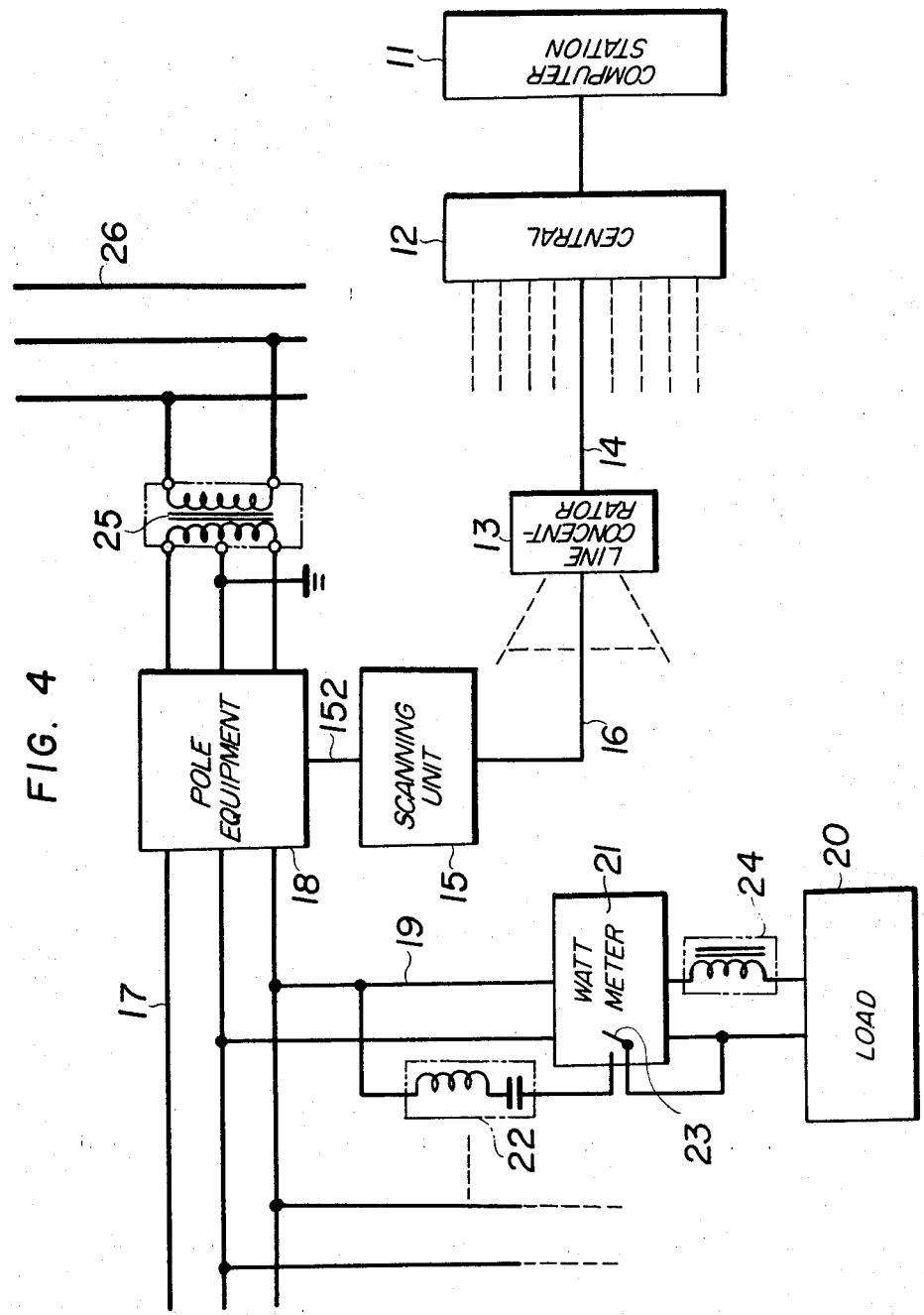
FIG. 4 is a block diagram of an information detection system forming the background of the invention.

FIG. 4 shows an information detection circuit for general integrating watt meters according to this invention, in which a central computer station 11 is coupled to a central device 12 having an exchange, buffer, etc. function through on-line or off-line. A line concentrator 13 is connected to the central device 12 through a communication line 14 on one hand, and to a plurality of scanning units 15 through a communication line 16. Each scanning unit is provided for each pole transformer and electromagnetically or electrostatically coupled to the low voltage distribution line 17 in pole-top equipments 18 disposed at places of said low voltage distribution line. From the low voltage distribution line, extension lines 19 are derived for respective users for supplying electric power to a load 20. An integrating watt meter 21 measures the electric power consumed and closes contacts 23 at every predetermined rotation of a rotating disk (not shown) of the watt meter, for example at every 1KWH consumption, to connect a pick-up unit 22 to the extention line 19 in parallel with the load 20. This pick-up unit comprises a series resonance circuit of an inductance and a capacitance tuned to a frequency peculiar to each user. Numeral 24 indicates a blocking coil for reducing the impedance variation of electric devices, 25 a pole transformer and 26 high voltage transmission lines.

Figure 5:
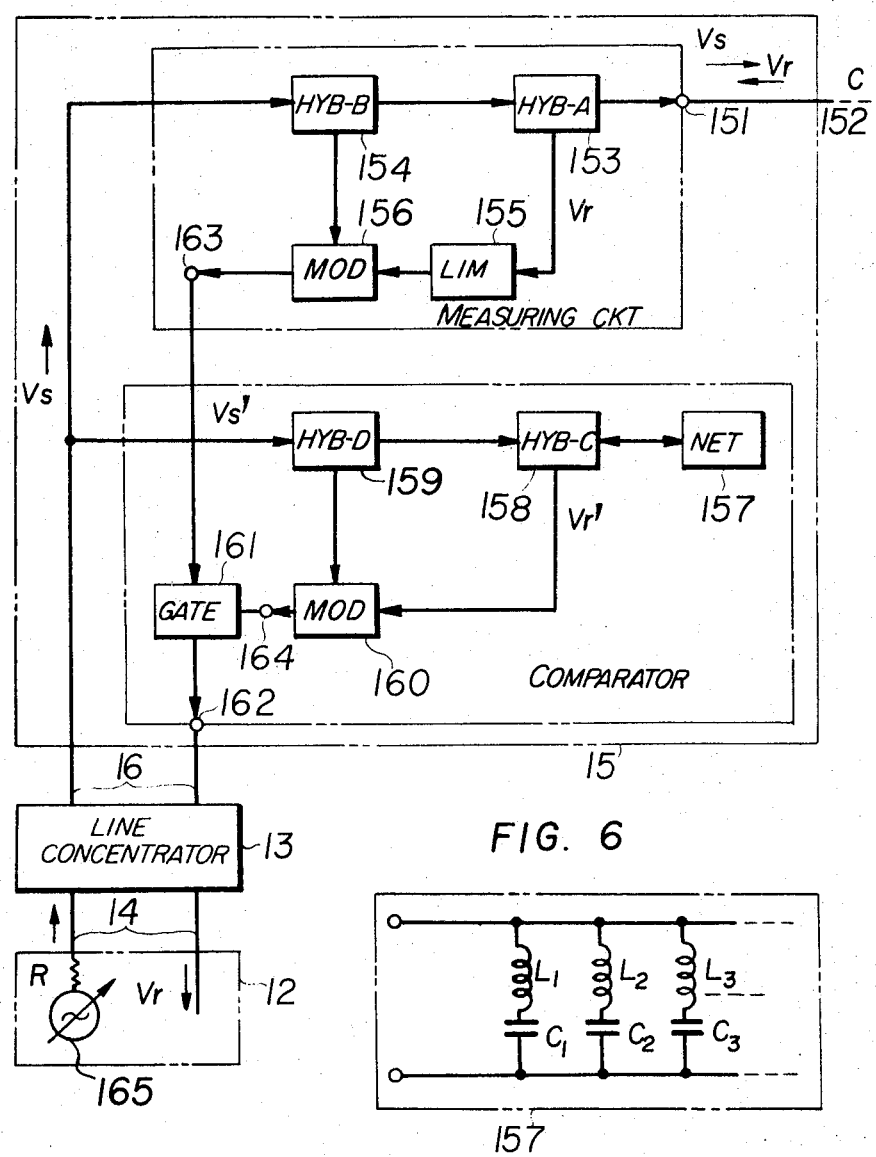
FIG. 5 is a block diagram of a sweep generator circuit and a scanning circuit according to the invention.
Figure 6:
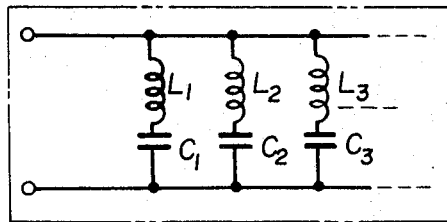
FIG. 6 is a structural circuits of a receiver circuit.

FIG. 5 shows a scanning circuit provided in the scanning unit and a sweep generator provided in the line concentrator or the central equipment. In the figure, numeral 151 indicates an information detection terminal, 152 a communication line to the pole-top equipment 18, 153 a hybrid circuit A for separating reflected waves from said communication line 152, 154 a hybrid circuit B for preventing noises on the communication line from mixing into the modulator, 155 an amplitude limiter, 156 a ring modulator for the measuring circuit, 157 a terminal circuit, 158 a hybrid circuit C for the comparator circuit, 159 a hybrid circuit D, 160 a ring modulator for the comparator circuit, 161 a sampling gate, 162 a detecting output terminal, 163 an output terminal of the measuring circuit, 164 an output terminal of the comparator circuit, and 165 a sweep generator provided in the central equipment 12.

The terminal circuit 157 comprises a parallel connection of a plurality of series resonance circuits having their peculiar resonance frequency equal to the predetermined sampling points of frequency, as seen in FIG. 8.

In the arrangement of FIG. 5, it is well known that only the reflected waves at the information detecting terminal 151 can appear on the detection circuit side of the hybrid circuit A 153. To the distribution line 17, only several pick-up units 22 are connected in parallel, thus the impedance is formed generally of a sure reactance, $jX$. Letting the sweep signal voltage of the sweep generator be $V_s$, the reflected wave $V_r$, and the characteristic impedance of the voltage source side R, the relation $$V_r = [(R - jK)/(R + jX)] V_s$$

holds, where the sweep signal $V_s$ and the reflected wave $V_r$ have opposite polarity.

$$|V_r| = \text{const} \quad |V_s| = \text{const}$$

$$A_{r_0} V_r = -2 \tan^{-1} X/R$$

Namely, the amplitude of the reflected wave is always constant irrespective of the terminal impedance and only the phase varies in accordance with the variation of the reactance $jX$. This phase becomes zero at the series resonance frequency and varies in the range from $-\pi$ to $\pi$. Thus, information (data) due to switching of a pick-up unit (information source) is included in the phase of the reflected wave. When the reflected signal passes through the amplitude limiter 155, the influences from noises, level fluctuation, etc. can be eliminated. This is same with the demodulation principles and signal-to-noise S/N ratio improvement characteristics of frequency modulated waves.

When such a reflected wave is mixed with the original signal in the ring modulator 156, the output becomes $$A \cos\theta,$$

where $\theta$ is the phase difference between the original and the reflected waves. Namely, the ring modulator 156 supplies at the detection output terminal 163 a positive pulse when the original and the reflected waves are in phase and a negative pulse when they are in opposite phase.

Further, since this is a kind of synchronous detection, no DC pulse appears at the output terminal even when a noise mixed in the circuit cannot be completely eliminated by the amplitude limiter, unless the noise is completely in phase with and of the same frequency as the original sweep signal from the sweep generator 165.

The hybrid circuit B 154 prevents noises mixed from the communication line 152 and the reflected wave $V_r$ from going to the ring modulator 156 through other routes than indicated by the arrows in FIG. 5. If a noise also passes through hybrid circuits A and B, namely circuits 153, 154 and reaches the ring modulator with the original wave, a DC pulse will apparently appear at the output terminal.

Then, description will be made as to the comparator circuit. The sweep generator 165 supplies a sweep signal to the measuring circuit which then applies the result to the sampling gate 161. At the same time, the output of the sweep generator 165 is also applied through the hybrid circuits D and C, namely circuits 159, 158 to the terminal circuit 157, and the reflected wave passes through the hybrid circuit C 158 and is applied to the ring modulator 160.

Since the terminal impedance circuit 157 is a pure reactance circuit, the ring modulator 160 generates a positive pulse at the sampling point, as is similar to the case described in the measuring circuit.

The sampling gate 161 opens upon receipt of this positive pulse and allows the sampled information from the measuring circuit to pass to the detection output terminal 162 which is coupled to the line concentrator 13 through communication line 16, at the proper frequency points. Then the central equipment 12 counts the output and integrates the power consumption of the respective users. Finally, the computer station 11 (FIG. 4) calculates the power rate.

What is claimed is:

1. An information detection system for detecting the data of a multiplicity of information sources coupled to a line, utilizing a sweep generator and the switching of resonance circuits associated individually with the respective information sources, comprising:

first hybrid circuit means for connecting the output of a sweep generator to said line through a first terminal and for deriving the reflected wave from said line through a second terminal, limiting means connected to said second terminal for amplitude limiting said reflected wave, and means for mixing the reflected wave with the output of said sweep generator after amplitude limitation to generate a detection output;

second hybrid circuit means connected to said sweep generator for preventing noises and the reflected waves from said line from mixing into said output of the sweep generator; and third hybrid circuit means for applying a part of the output of said sweep generator to a parallel connection circuit of series resonance impedances which resonate at respective sampling frequencies, means for mixing the reflected wave with said output of the sweep generator to provide a sampling pulse, and means for sampling the detection output in response to generation of said sampling pulse.

2. A system for detecting data in a multiplicity of information sources coupled to a line by opening and closing resonance circuits individually associated with the respective information sources, comprising:

a. a sweep generator generating an output signal including a plurality of frequencies;

b. at least one hybrid circuit means for transmitting the output signal of said sweep generator to said line through inputs and outputs thereof, one part of said hybrid circuit means having a further output for delivering a reflected signal from said line and the other part of said hybrid circuit means having a further output for delivering the output signal of said sweep generator;

c. at least one amplitude limiter for limiting the amplitude of the reflected signal which is received from the further output of the one part of said hybrid circuit means so as to deliver an amplitude-limited output signal;

d. at least one ring modulator receiving the output signal of said amplitude limiter and the output signal delivered by the further output of the other part of said hybrid circuit means and mixing said signals so as to form therefrom a first phase dependent output signal;

e. at least one terminal circuit comprising a parallel connection of series resonant impedances;

f. at least a second hybrid circuit means for transmitting a part of the output signal of said sweep generator to said terminal circuit through inputs and outputs thereof, one portion of said second hybrid circuit means having a further output for delivering a standard reflected signal which is received from said terminal circuit and the other portion of said second hybrid circuit means having a further output for delivering the output signal of said sweep generator;

g. at least one second ring modulator for receiving the standard reflected output signal and the further output signal and mixing said signals so as to form therefrom a second phase dependent output signal and delivering the same; and h. at least one gate (161) controlled by the second phase dependent output signal to gate the first phase dependent output signal.

3. A system according to claim 2, characterized in that the circuit components (b) to (h) are combined to form at least one scanning unit.

4. A system according to claim 3, characterized in that said at least one scanning unit is associated with said sweep generator.

5. A system according to claim 3, characterized in that said system further comprises a line concentrator arranged between said at least one scanning unit and said sweep generator.

* * * * *